(12) United States Patent
Silverstein et al.

(10) Patent No.: US 7,050,978 B2
(45) Date of Patent: May 23, 2006

(54) SYSTEM AND METHOD OF PROVIDING EVALUATION FEEDBACK TO A SPEAKER WHILE GIVING A REAL-TIME ORAL PRESENTATION

(75) Inventors: D. Amnon Silverstein, Mtn. View, CA (US); Tong Zhang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 796 days.

(21) Appl. No.: 10/132,980

(22) Filed: Apr. 26, 2002

(65) Prior Publication Data

US 2003/0202007 A1    Oct. 30, 2003

(51) Int. Cl.
*G10L 21/06* (2006.01)

(52) U.S. Cl. .................................................. 704/271
(58) Field of Classification Search ............... None
See application file for complete search history.

(56) References Cited

U.S. PATENT DOCUMENTS 6,801,604 B1* 10/2004 Maes et al. ............ 379/88.17

* cited by examiner

*Primary Examiner*—Susan McFadden

(57) ABSTRACT

A system for and method of providing feedback information relating to characteristics of the oral presentation to a speaker while giving a real-time oral presentation by analyzing representations of the audio signal corresponding to the oral presentation. The feedback information can then be provided to the speaker during the real-time presentation to assist the speaker and improve the oral presentation.

26 Claims, 9 Drawing Sheets

US 7,050,978 B2

SYSTEM AND METHOD OF PROVIDING EVALUATION FEEDBACK TO A SPEAKER WHILE GIVING A REAL-TIME ORAL PRESENTATION

FIELD OF THE INVENTION

The present invention relates to a system and method for assisting a speaker while giving a real-time oral presentation, and in particular this disclosure provides a system and method for providing evaluation feedback to the speaker during the real-time oral presentation.

BACKGROUND OF THE INVENTION

Many people have anxieties and fears about speaking in front of a group. In fact, the fear of public speaking has been listed as greater than the fear of death. Often, these fears affect an individuals ability to effectively speak in public. For instance, individuals may speak too soft/loud or too slow/fast due to their nervousness or lack of practice. Due to this common and often intense fear, there are many books, video tapes, classes, etc. offered to educate or assist individuals to publically speak.

In general, most of these educational remedies include an exercise of speaking in front of a group. For instance, individuals often practice in front of friends, family members, instructors, peers and/or a video camera to gain experience and confidence as well as providing a means of evaluating the individual's speaking skills. Generally, after the individual is done speaking, the audience provides feedback indicating whether the speaker spoke too loudly/softly, too fast/slow, used slang or filler words (such as "uhm" or "ah"), or whether there were long pauses. The problem with this type of critique is that they are very subjective and, as a result, inconsistent. For instance, a speaker's volume may be too loud/fast for one listener while being at the correct volume/speed for another. In addition, since this type of feedback is provided to the individual after giving the speech it can only be used to improve the individual's future speeches. As a result, the benefits of this type of feedback can only be realized in future speeches and not the present speech.

Hence a need exists for a system and method of providing feedback on a real-time basis to a speaker to allow them to improve the quality of their real-time oral presentations and future presentations.

SUMMARY OF THE INVENTION

A system of providing feedback information corresponding to a real-time oral presentation is described. In one embodiment, the system includes a signal processor for processing the audio signal corresponding to and during a real-time oral presentation. At least one representation of the audio signal is generated including at least an energy function representation and a zero-crossing rate function representation. The at least one representation is provided to an analyzer which generates at least one characterizing indicator corresponding to the oral presentation. In response to the at least one characterizing indicator, an output device provides feedback information during the real-time oral presentation.

A method of providing feedback information corresponding to a real-time oral presentation is described in which the audio signal corresponding to the oral presentation is processed to generate at least one representation of the audio signal including at least an energy function representation and a zero-crossing rate function representation. At least one of the representations is analyzed to obtain at least one indicator characterizing the oral presentation. Feedback information is determined from the characterizing indicators and can be provided during the real-time presentation.

DETAILED DESCRIPTION OF THE INVENTION

Figure 1:
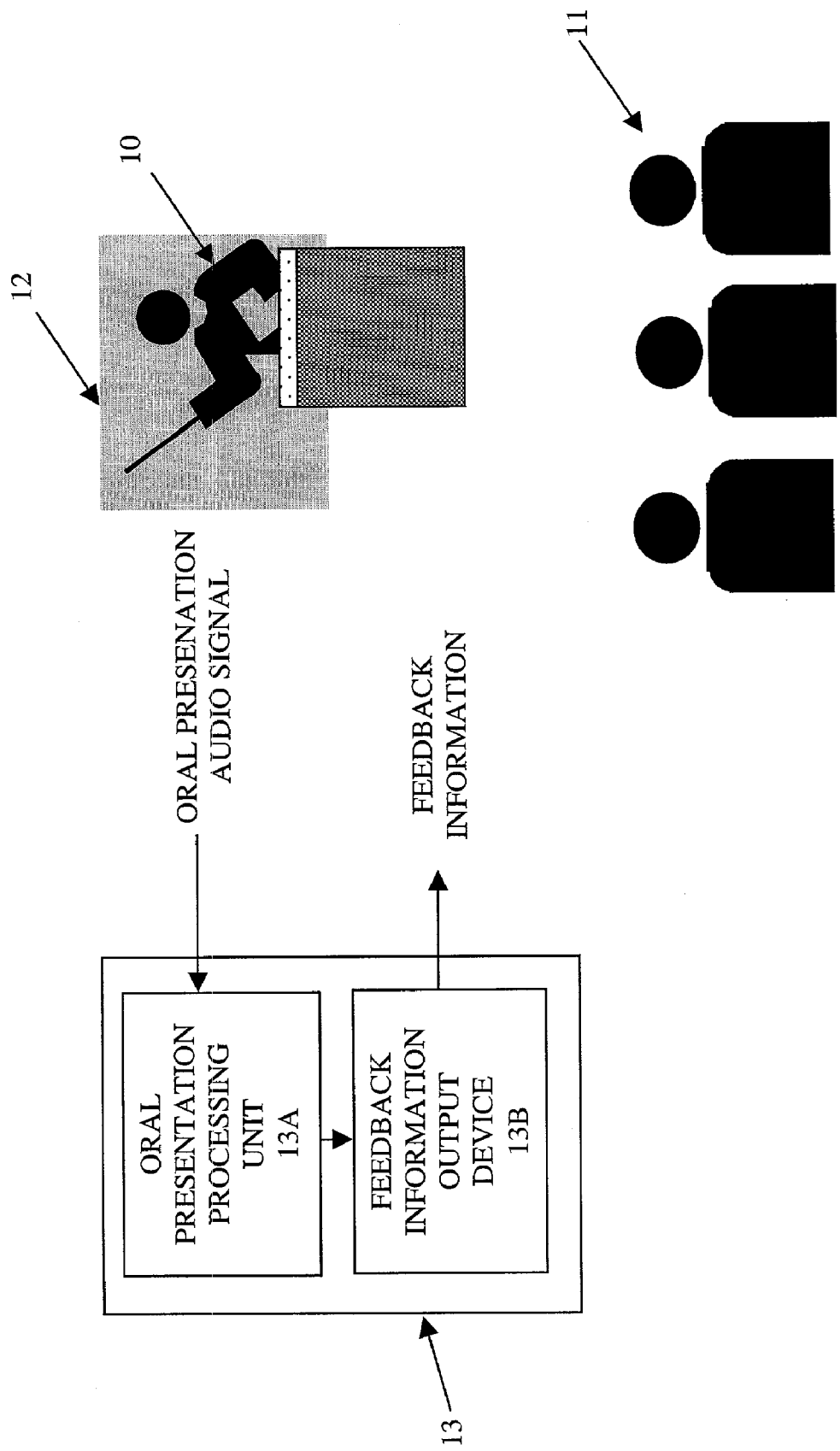
FIG. 1 shows a real-time oral presentation and the application of the present invention employed during the presentation.

In general, a system and method are described for providing feedback information characterizing an oral presentation, and in one embodiment, for providing the feedback information to a speaker during the real-time oral presentation on a real-time basis. FIG. 1 shows an example of one application of the system and method of providing feedback information to a speaker in which a speaker 10 is giving a real-time oral presentation to an audience 11 which may include a slide presentation 12. FIG. 1 further shows a system 13 including at least an Oral Presentation Processing Unit 13A for receiving at least the audio signal corresponding to a real-time oral presentation and for processing the audio signal to generate at least one characteristic indicator corresponding to the audio signal, and a Feedback Information Output Device 13B for providing feedback information characterizing the oral presentation in response to the at least one characteristic indicator.

In one embodiment, the feedback information is provided during the oral presentation on a real-time basis. In another embodiment, the feedback information is stored and provided after the oral presentation. It should be understood that feedback information according to the present invention can be generally defined as information that can be used to evaluate or describe the characteristics of an oral presentation and can include pace, volume, filler words used, identification of long pauses, tone, time usage, inflection, and grammer. The feedback information can be used by the speaker or others to evaluate the oral presentation and assist the speaker in improving their public speaking capabilities. Since, the feedback information can be provided on a real-time basis during the oral presentation, the speaker can immediately gain the benefits of the feedback information while giving the presentation. In one embodiment, the feedback information is phrases such as commands (e.g., "speak softer") or evaluative statements (e.g., "too loud").

In one embodiment, characterizing indicators correspond to control signals for causing the Output Device 13B to output the feedback information. In another embodiment, characterizing indicators are used to access stored feedback information. For example, in response to the characterizing indicators, Output Device 13B accesses pre-stored feedback information in the form of textual phrases which is provided during the real-time presentation to the speaker. Specifically, in response to a characterizing indicator indicating that the actual volume has exceeded a preselected high volume threshold, Output Device 13B may display on a monitor (visible to the speaker) the phrase "too loud". Alternatively, Output Device 13B may provide an audio signal (audible to the speaker through an earphone) corresponding to the phrase "too loud". Hence, in accordance with the present invention, the feedback information may be one of an audio, visual, or a combination of an audio and visual signal.

Figure 2:
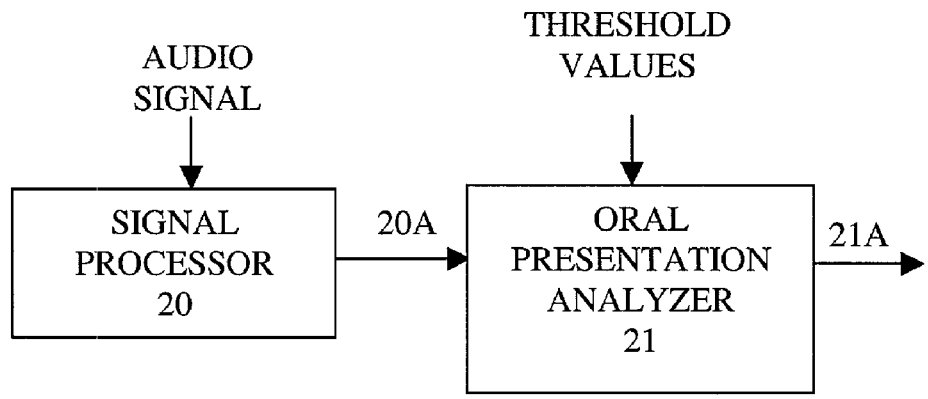
FIG. 2 illustrates one embodiment of an oral presentation processing unit in accordance with the present invention.

FIG. 2 illustrates a block diagram of one embodiment of the Oral Presentation Processing Unit shown in FIG. 1. The audio signal is received by a Signal Processor 20 which processes the audio signal to generate at least one representation 20A of the audio signal including at least an energy function representation and a zero-crossing rate function representation. Examples of other representations can include but are not limited to spectrum, cepstrum, LPC coefficients, harmonic coefficient function, speech filter functions, etc. It should be noted that audio signal in one embodiment corresponds to at least the oral presentation being given by the speaker. The at least one audio signal representation 20A is received by an Oral Presentation Analyzer 21 which analyzes the at least one representation using threshold values to generate at least one indicator characterizing the oral presentation.

Figure 3A:
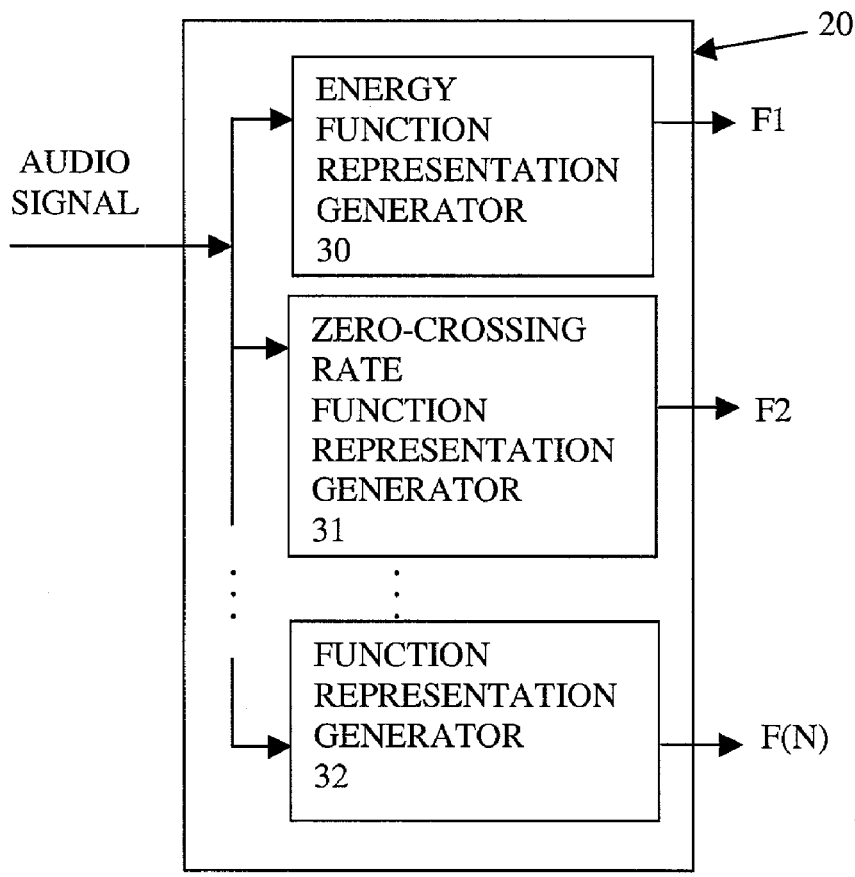
FIG. 3A illustrates one embodiment of a signal processor in accordance with the present invention.

FIG. 3A illustrates one embodiment of a Signal Processor 20 (FIG. 2) in accordance with the present invention including at least an Energy Function Representation Generator 30 and a Zero-Crossing Rate Function Representation Generator 31. Each of the Representation Generators 30 and 31 receive the audio signal corresponding to at least the oral presentation and generate at least an energy function representation (F1) of the audio signal and a zero-crossing rate function representation (F2) of the audio signal. FIG. 3A also shows that the Signal Processor 20 can include other function generators 32 for generating other representations F(N).

Figure 3B:
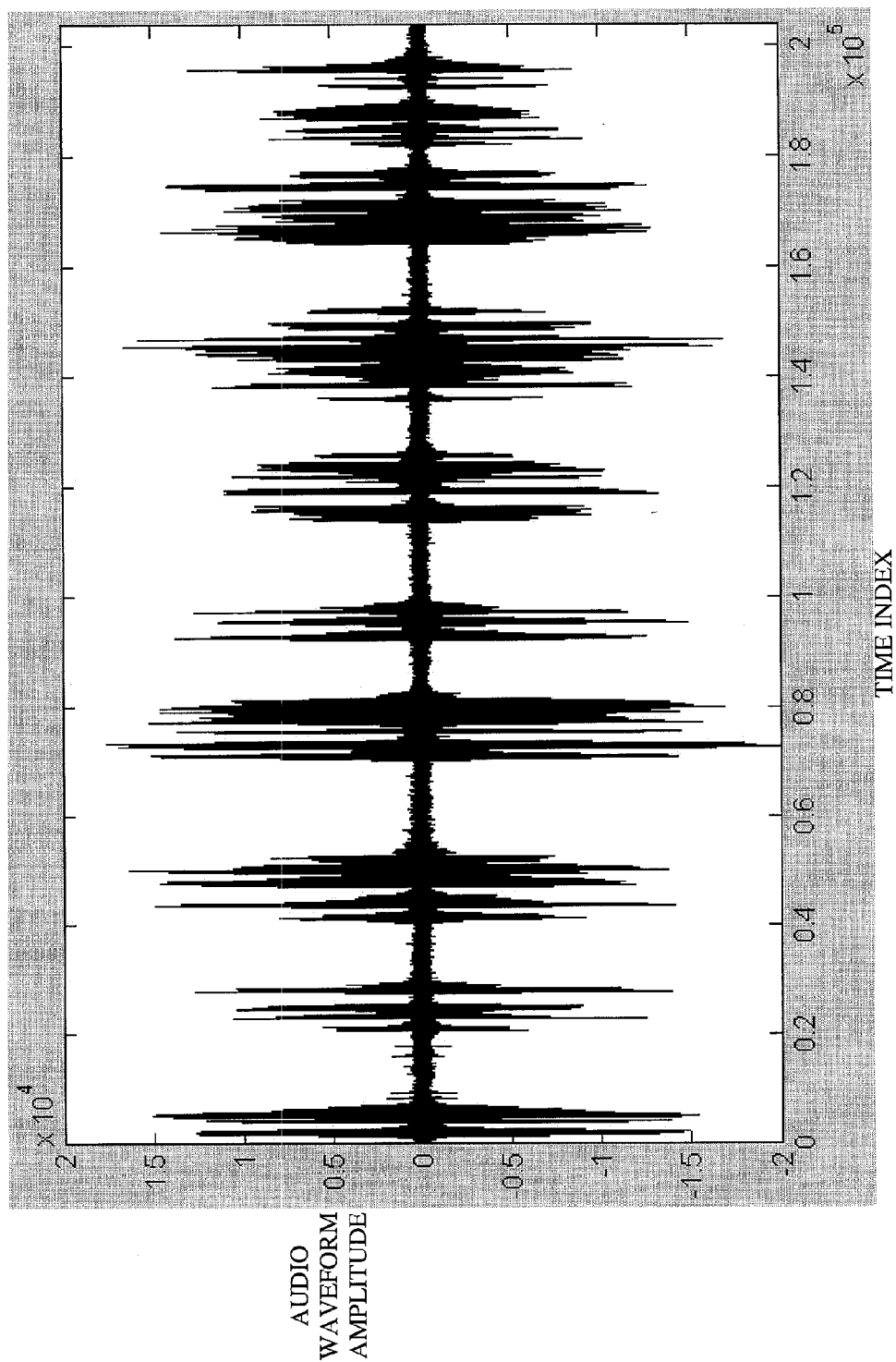
FIGS. 3B–3D show an example of an audio waveform of a speech signal and its corresponding energy function representation and a zero-crossing rate representation, respectively.
Figure 3C:
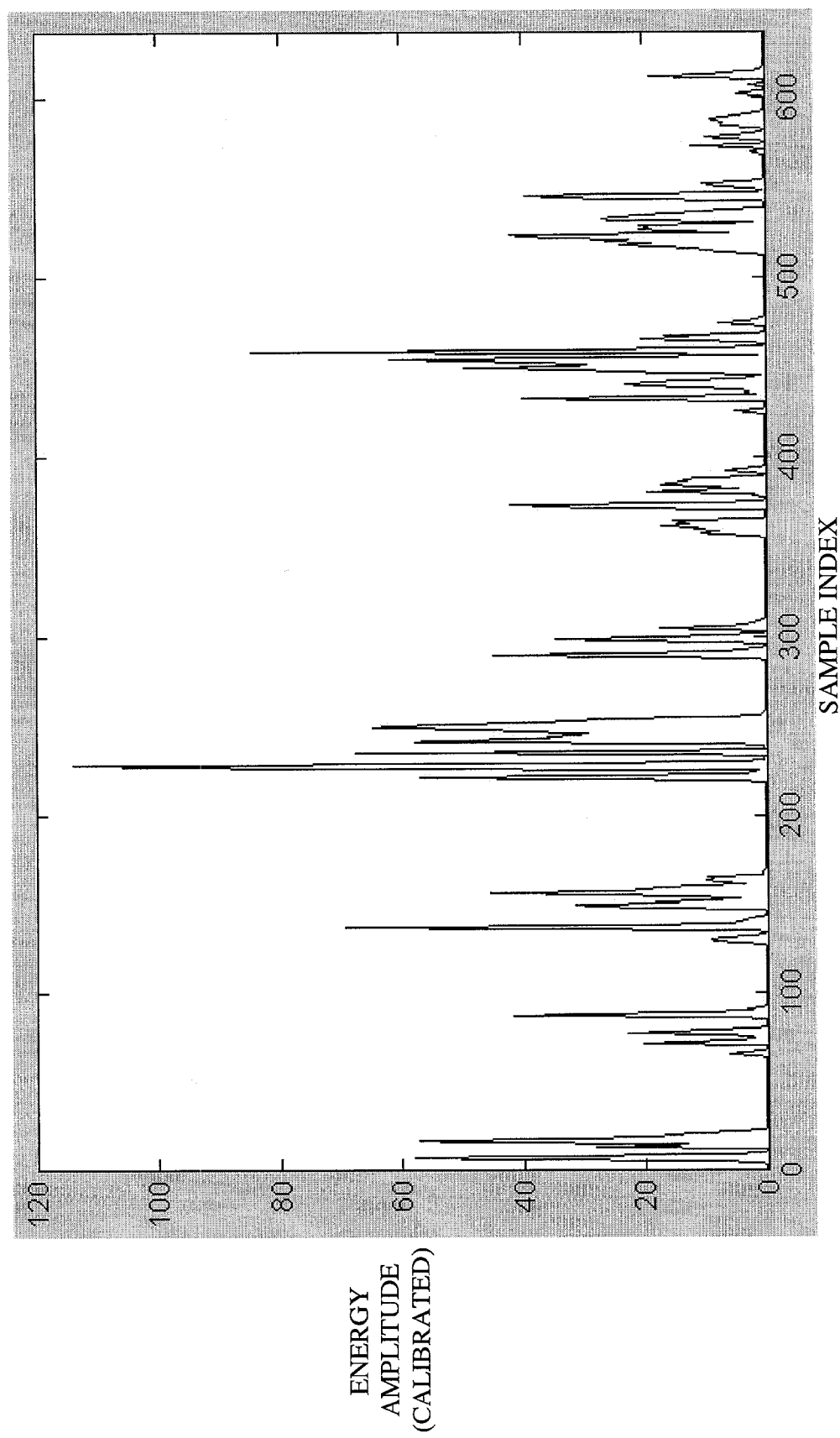

FIG. 3B shows an example of an audio waveform and FIG. 3C shows its corresponding energy function representation. In one embodiment, the audio signal is digitized prior to generating a corresponding energy function representation. In one embodiment, the energy function is a short-time energy function as defined below by Eq. 1:

$$E_n = \frac{1}{N}\sum_m [x(m)w(n-m)]^2 \qquad \text{Eq. 1}$$

where x(m) is the discrete time audio signal, m is the time index of the audio sample, n is the time index of the short-time energy, and w(m) is the rectangle window:

$$w(m) = \begin{cases} 1 & 0 \le m \le N-1 \\ 0 & \text{otherwise} \end{cases}$$

where N is length of the window. The short-time energy representation shows amplitude variation over the time. In one embodiment, in which it is assumed that the audio signal changes relatively slowly within a small interval, $E_n$ is computed every 10–20 ms. For example, suppose the sampling rate of audio signal is 8000 Hz, $E_n$ is computed around every 100 audio samples. In one embodiment, the window length is set to be larger than this interval so that there is an overlap between neighboring audio frames. For example, if $E_n$ is computed every 100 samples, the window length can be set for 150 samples.

Figure 3D:
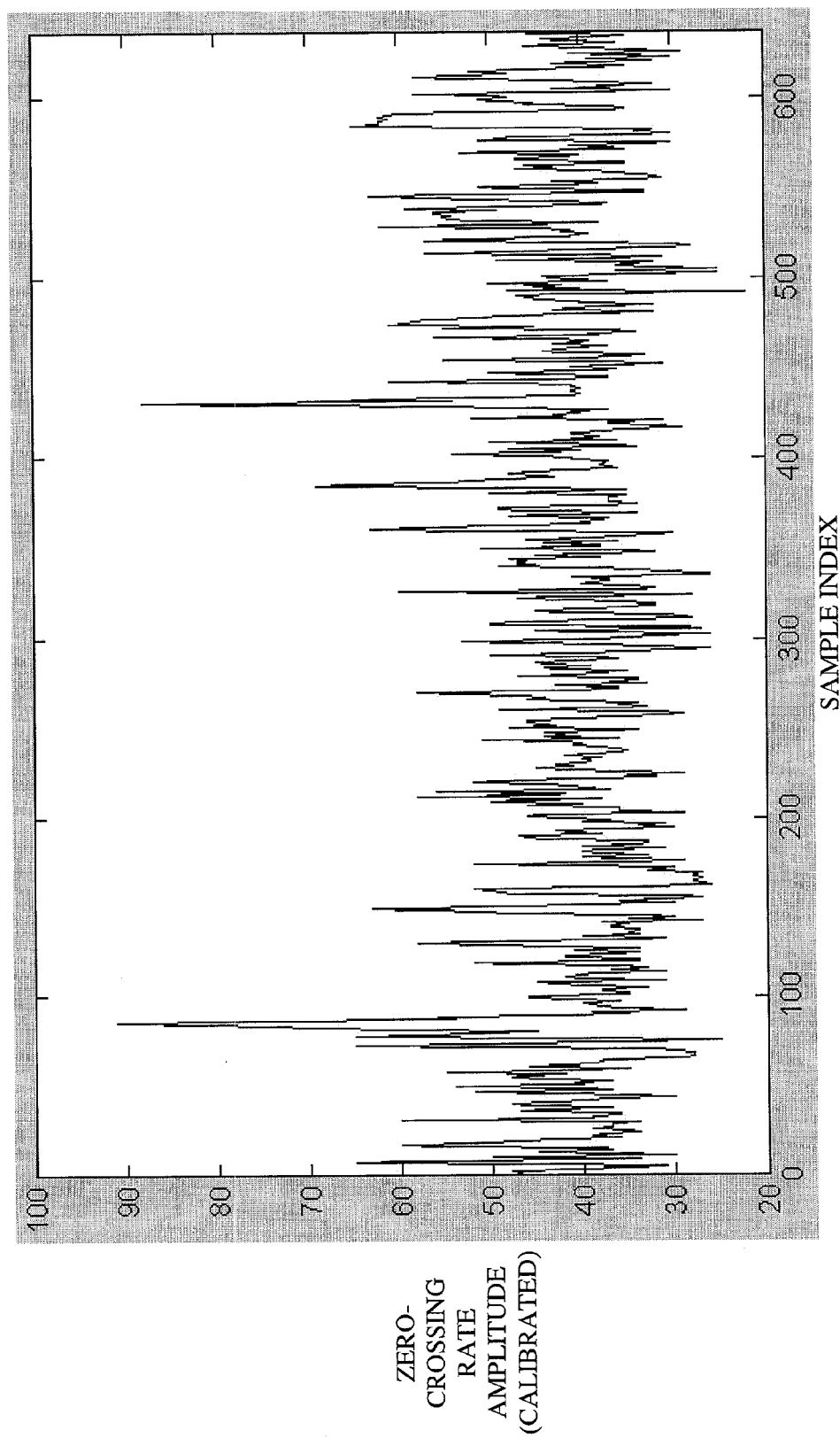

FIG. 3D shows an example of a zero-crossing rate function representation of the audio waveform shown in FIG. 3B. In one embodiment, the audio signal is digitized prior to generating a corresponding zero-crossing rate function representation. In one embodiment, the zero-crossing rate function is a short-time average zero-crossing rate function. In the context of discrete-time signals, a zero-crossing is said to occur if successive samples have different signs. The rate at which zero-crossings occur is a measure of the frequency content of a signal. The short-time average zero-crossing rate (ZCR) is defined by Eq. 2:

$$Z_n = \frac{1}{2N}\sum_m |sgn[x(m)] - sgn[x(m-1)]|w(n-m), \qquad \text{Eq. 2}$$

where $$sgn[x(m)] = \begin{cases} 1 & x(m) \ge 0 \\ -1 & x(m) < 0, \end{cases}$$

and $$w(m) = \begin{cases} 1 & 0 \le m \le N-1 \\ 0 & \text{otherwise} \end{cases}$$

Similar to the energy function, $Z_n$ can be computed every 10–20 ms, and the length of the window can be set to be larger than the interval so that neighboring audio frames have overlap with each other.

Figure 4A:
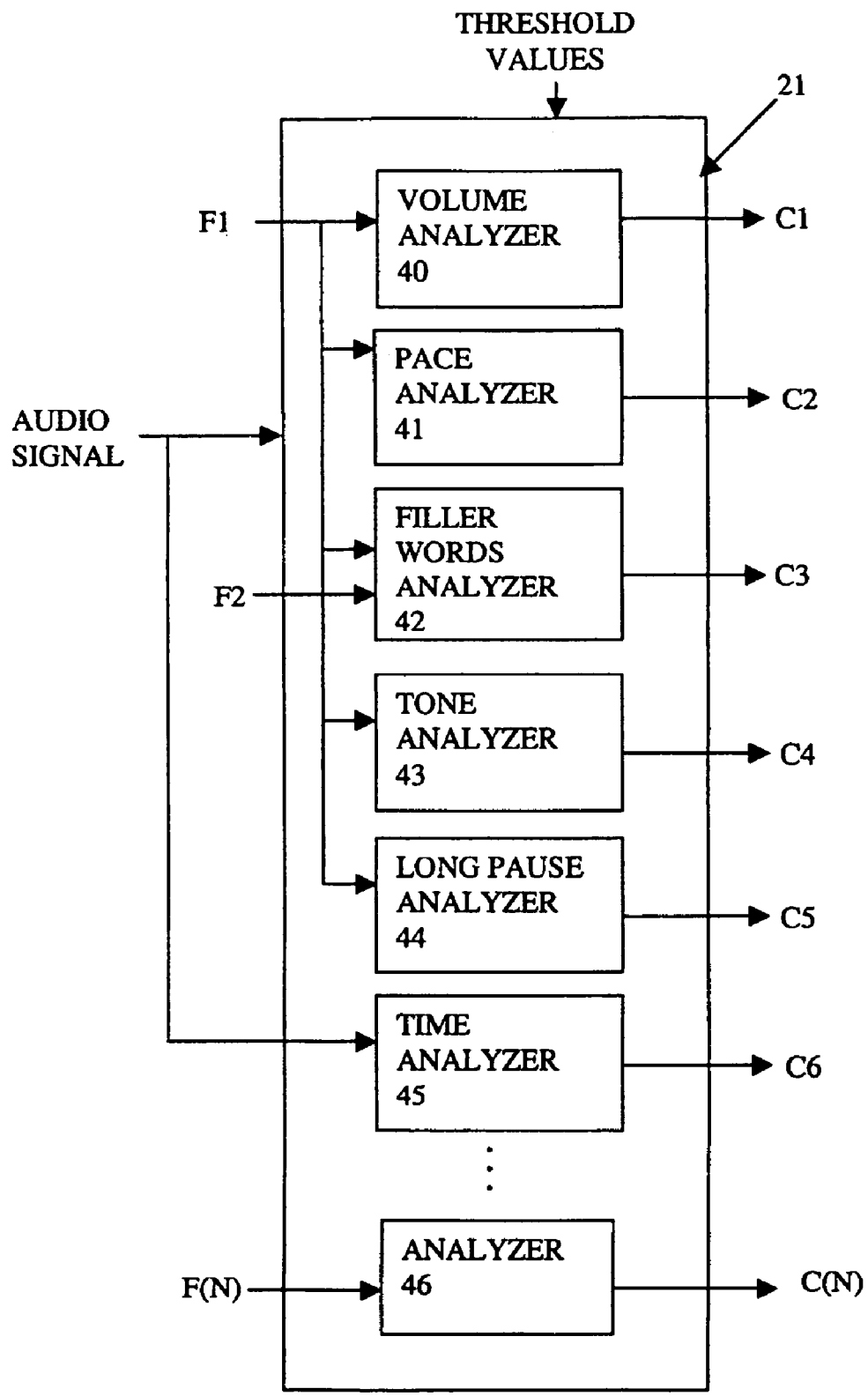
FIG. 4A illustrates one embodiment of an oral presentation analyzer in accordance with the present invention.

FIG. 4A illustrates one embodiment of an Oral Presentation Analyzer 21 (FIG. 2) in accordance with the present invention including at least one analyzer (40–46) for receiving the at least one representation F1–F(N) and providing characterizing indicators C1–C(N)). In one embodiment, the Oral Presentation Analyzer 21 uses threshold values to analyze the oral presentation and determine the characterizing indicators. In another embodiment, the Analyzer 21 uses the audio signal to determine characterizing indicators.

Referring to FIG. 4A, Volume Analyzer 40 receives an audio signal representation and generates characterizing indicator C1. In one embodiment, Volume Analyzer 40 receives the energy function representation F1 and detects energy peaks in a given interval of the representation. When a large percentage of the energy peaks within a limited period is lower than a lower volume threshold value, TL, then the volume of the speaker is identified as too low. If a large percentage of the energy peaks within a limited period is higher than a higher volume threshold value TH, then the volume of the speaker is identified as too high. Characterizing indicator C1 is representative of the volume determination. For instance, if it is determined that the oral presentation is too loud, then the characterizing indicator C1 may be a digital "+1", if the oral presentation is too soft then the characterizing indicator may be a digital "−1", and if the presentation is within a normal volume range then the characterizing indicator may be a digital "0".

Pace Analyzer 41 receives an audio signal representation and generates characterizing indicator C2. In one embodiment, Pace Analyzer 41 receives the energy function representation F1 and detects the number of peaks within a given interval of the function to identify number of syllables spoken in the interval. It has been determined that the number of peaks in a given interval closely correlate to the number of syllables spoken in an interval. The number of peaks is compared to a preselected range which, in one embodiment, corresponds to an acceptable pace. When the oral presentation exceeds or is below the preselected range, Pace Analyzer 41 generates characterizing indicator C2 corresponding to whether the oral presentation is too fast or too slow. For instance, if it is determined that the oral presentation is too fast, then C2 may be set to a digital "+1", if the oral presentation is too slow then C2 may be a digital "−1", and if the presentation is at the right pace then C2 may be a digital "0".

Figure 4B:
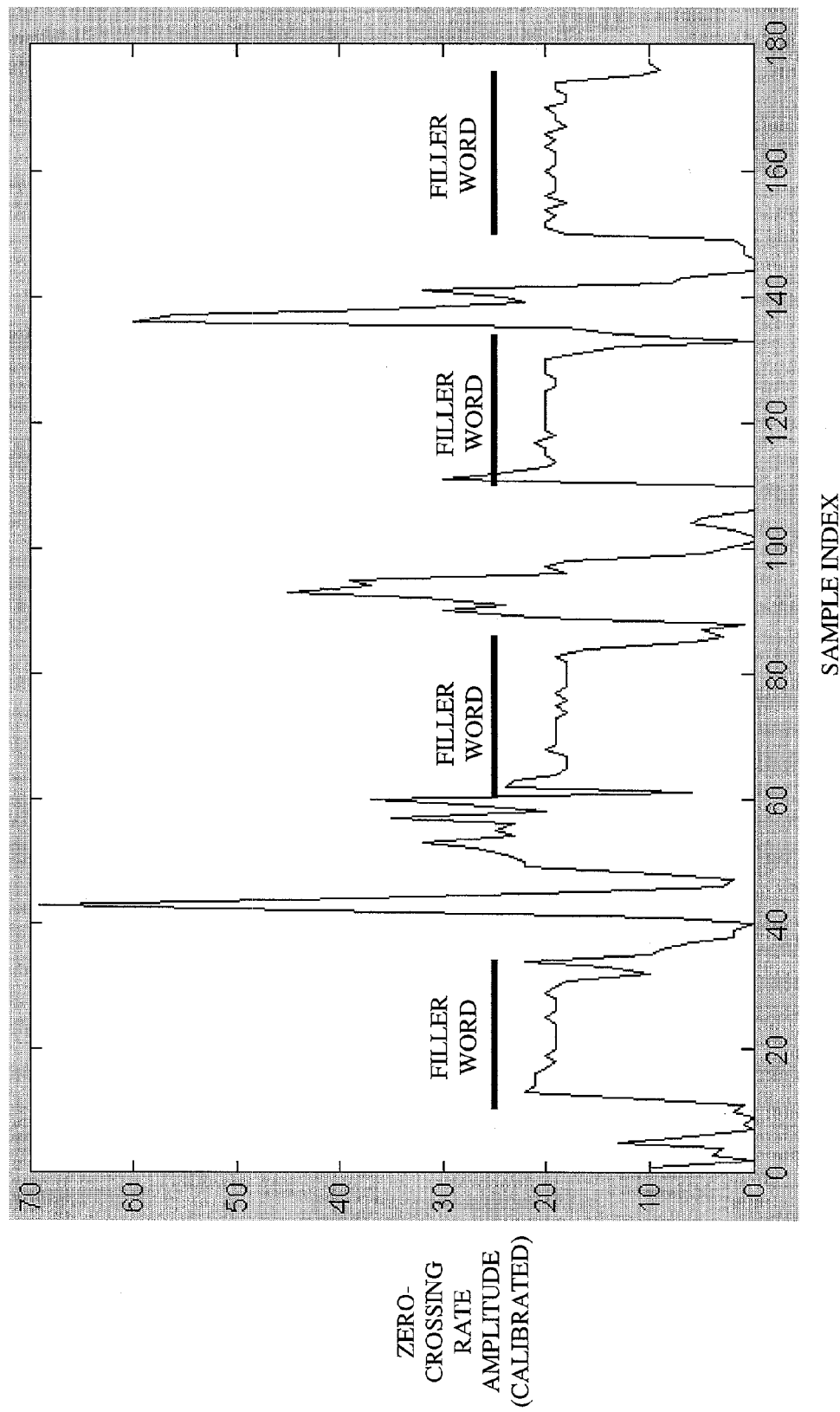
FIGS. 4B and 4C show examples of a zero-crossing rate function representation and an energy function representation showing filler words occurring in an audio waveform.
Figure 4C:
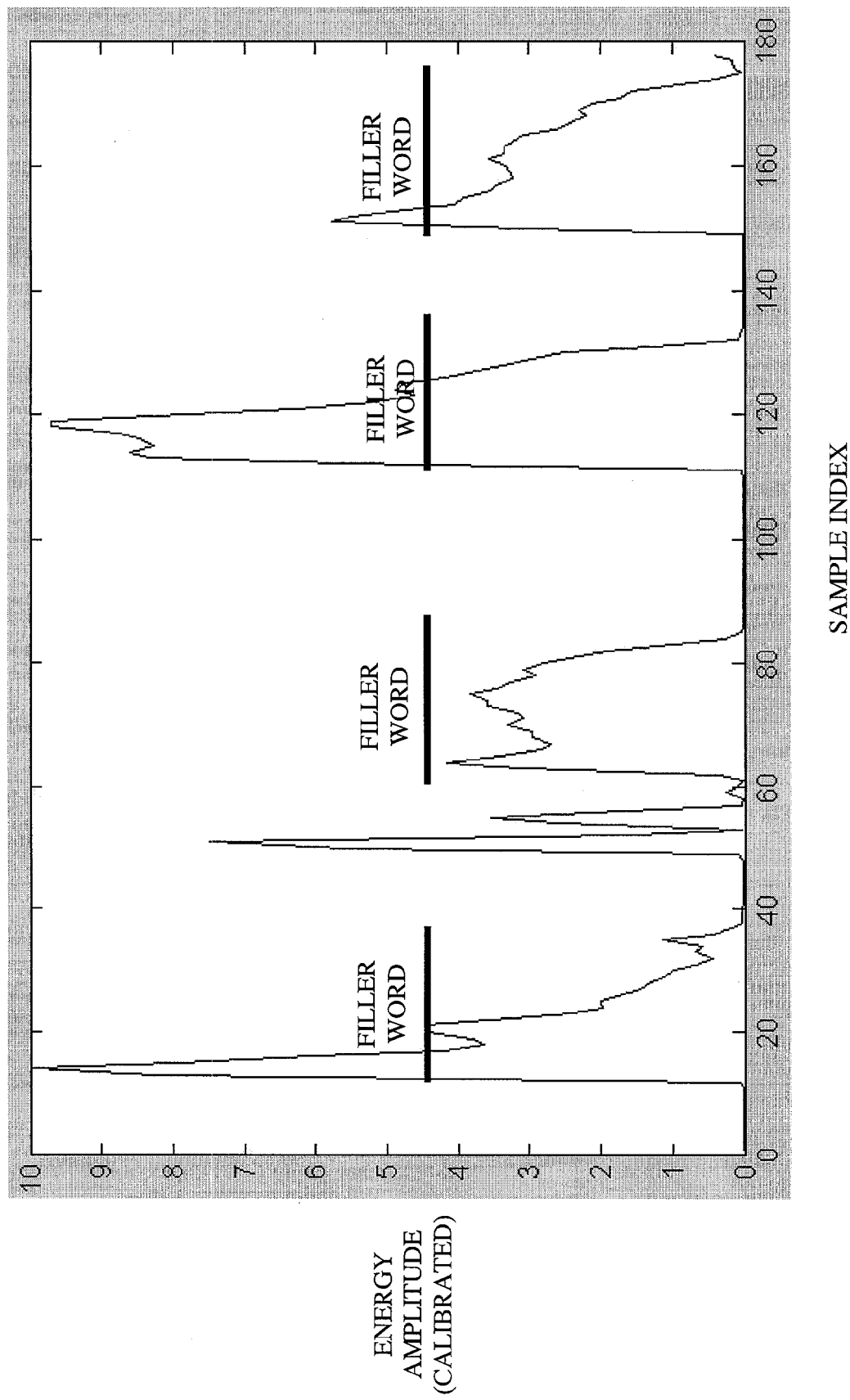

Filler Word Analyzer 42 receives an audio signal representation and generates characterizing indicator C3. In one embodiment, Filler Word Analyzer 42 receives a zero-crossing rate function representation F2 of the audio signal and detects flat intervals within the representation. It has been determined that flat intervals correspond to filler words in the presentation. For instance, when speaking the words "Uhm" or "Ahh", the zero-crossing rate representation is flat because the frequency of speech signal does not change, Filler Word Analzyer 42 generates a characterizing indicator C3 to identify each time a filler word is detected. For instance, each time a filler word is encountered, characterizing indicator C3 may transition from a digital "0" to a digital "1". In another embodiment, Filler Word Analyzer 42 receives the energy function representation F1 of the audio signal and detects intervals without significant troughs (i.e. troughs with amplitude higher than a predetermined threshold) within the representation. More specifically, when the energy signal is maintained at the same energy level for a given interval with no variation in the magnitude, the representation will be without troughs. It has been determined that these intervals typically correspond to filler words in the presentation. In one embodiment, Filler Word Analyzer 42 identifies filler words using both of the energy function representation and the zero-crossing rate function representation as described above. FIGS. 4B and 4C show examples of a zero-crossing rate function representation and the energy function representation showing filler words occurring in an audio waveform. Specifically, areas without significant troughs in the energy function representation shown in FIG. 4B correspond to filler words. Areas where the waveform is flat in the zero-crossing function representation shown in FIG. 4C also correspond to filler words.

Tone Analyzer 43 receives an audio signal representation and generates characterizing indicator C4. In one embodiment, Tone Analyzer 43 receives an energy function representation F1 of the audio signal and detects variances of amplitude of energy peaks within the energy function representation to determine a tone variation value of the oral presentation. It has been determined that the variation in energy peaks of the energy function representation of an audio signal corresponds to the tone of the audio signal. An audio signal having few variations in energy level generally is perceived by listeners to be monotonous. The tone variation value is compared to a preselected tone variation threshold value. Tone Analyzer 43 generates a characterizing indicator C4 when the audio signal tone value is significantly greater or less than the preselected tone variation threshold value. In one embodiment, when the audio signal does not conform to the tone threshold value, characterizing indicator C4 may transition from a digital "0" to a digital "1"

Long Pause Analyzer 44 receives an audio signal representation and generates characterizing indicator C5. In one embodiment, Long Pause Analyzer 44 receives energy function representation F1 and detects intervals of no energy or very low energy (i.e. there is only background noise). When there is no speech signal (i.e., a long pause in which the speaker does not speak), the energy function representation indicates no or very low energy. Long Pause Analyzer 44 generates a characterizing indicator C5 when the energy function indicates a relatively long interval of no energy or very low energy (e.g., characterizing indicator C5 may transition from a digital "0" to a digital "1").

Figure 5:
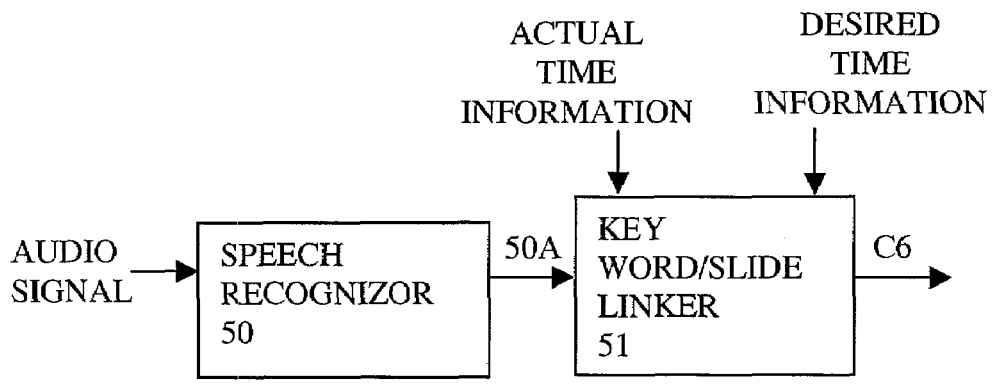
FIG. 5 illustrates one embodiment of a time analyzer in accordance with the present invention.

Time Analyzer 45 receives an audio signal and generates characterizing indicator C6 relating to the oral presentation time. In one embodiment, C6 relates to one of elapsed time or time remaining. In one embodiment, the characterizing indicator C6 corresponds to a time associated with a specific slide in a slide presentation being displayed during the oral presentation. FIG. 5 shows one embodiment of the Time Analyzer 45 for providing time information associated with a given slide dependent on the oral presentation including a speech recognizer 50 and a keyword/slide linker 51. In this embodiment, the speaker ensures that a specific phrase is initially spoken in the oral presentation when displaying each or selected slides. For instance, when initially displaying an "introduction" slide the speaker may voice the phrase "To begin with". Alternatively, when displaying a "conclusion" slide the speaker may voice the phrase "To conclude". Other keywords that may be stated at the start of certain slides include "outline", "motivation", "previous work", etc. The Speech Recognizer 50 receives the audio signal and identifies the keywords or phrases within the oral presentation and generates signal 50A identifying the keyword/phrase. The Key Word/Slide Linker receives signal 50A corresponding to the identified keyword/phrase and links the slide to a predetermined time information. The time information is compared to an actual time information for the oral presentation. Characterizing indicator C6 may correspond to a difference between the actual time information and a desired time information. In one embodiment, the characterizing indicator may correspond to a message that the speaker should move to the next slide. In another embodiment, the characterizing indicator may correspond to a message indicating time elapsed or time remaining. It should be noted that prior to an oral presentation, user controlled parameters such as allowed duration of the speech can be set within the system to enable the system to determine time remaining.

It should be noted that any and all of the elements as shown in FIGS. 1–5 may be implemented individually or by any combination of hardware, firmware, or software.

In one embodiment of the Oral Presentation Analyzer 21, the threshold values are user selected values. For instance, the user may provide an allotted amount of time for a speech. In another embodiment, threshold values may be preselected values based on known desired speech traits. For instance, a commonly acceptable pace to most listeners would correspond to a preselected number of peaks that the actual number of peaks of the energy function representation is compared to by Analyzer 41. In one embodiment, preselected threshold values may be selected dependent on the space (e.g., meeting room, auditorium, etc.) in which the presentation is to be given in. For instance, preselected volume thresholds may be selected by testing an audio signal for volume dependent on audience location with respect to the speaker within the space (i.e., close to speaker, farthest from speaker) to determine what the minimum acceptable volume threshold should be set at. In another embodiment, a different speaker's oral presentation may be analyzed by the system to obtain selected threshold values. For instance, an audio signal corresponding to a different speaker's oral presentation may be analyzed by the Oral Presentation Analyzer 21 during a calibration stage to determine the selected threshold values to compare the speaker's real-time oral presentation.

It should be noted that the audio signals may also correspond to audience reactions (e.g., laughter, etc.) which, in one embodiment, can be processed by processor 20. The audience reaction can then be provided to the speaker during or after the oral presentation in order to adjust the oral presentation in response to the audience reaction.

Figure 6:
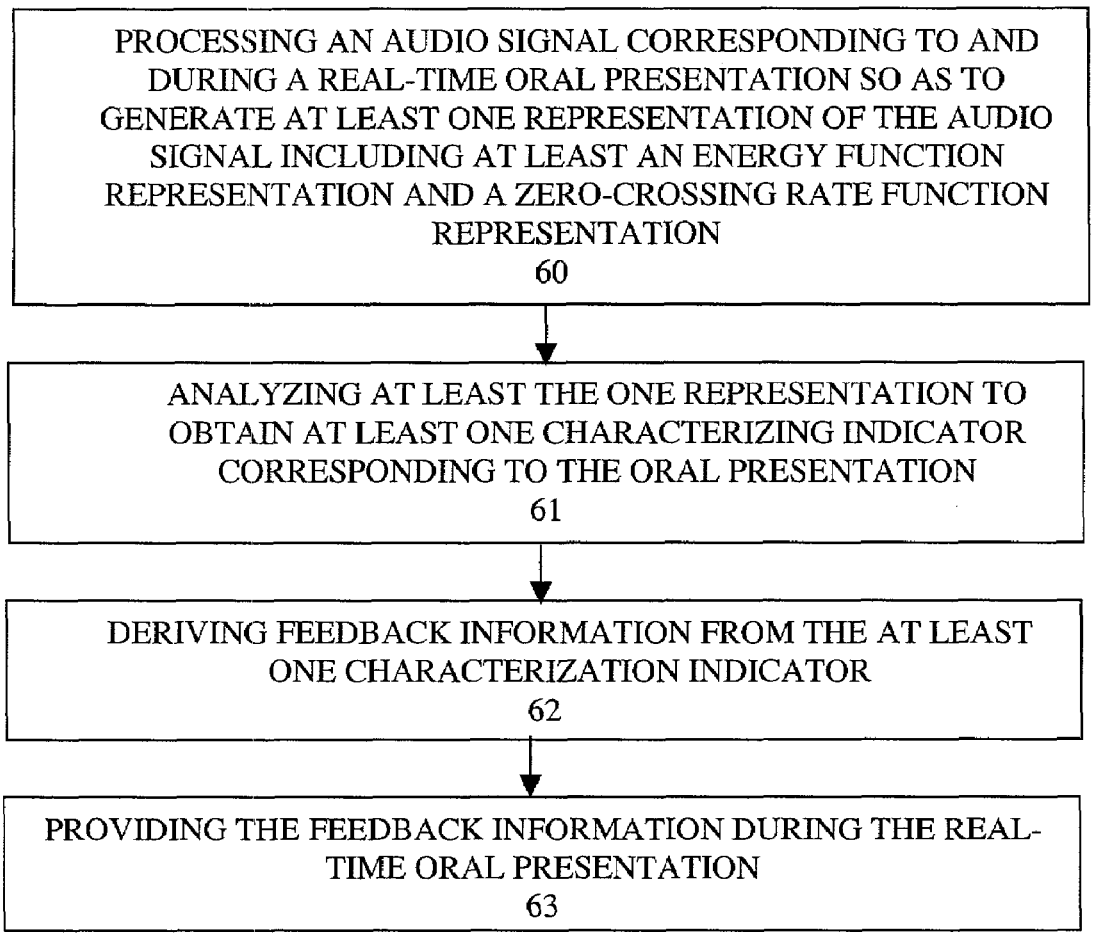
FIG. 6 illustrates one embodiment of a method of providing feedback information corresponding to an oral presentation in accordance with the present invention.

FIG. 6 illustrates one embodiment of the method in accordance with the present invention including processing an audio signal corresponding to a real-time oral presentation so as to generate at least one representation of the audio signal including at least an energy function representation and a zero-crossing rate function representation (60). At least one characterizing indicator corresponding to the oral presentation is obtained by analyzing at least one of the representations (61). In one embodiment, the characterizing indicator corresponds to a signal generated that represents a characteristic of the oral presentation. For instance, the characterizing indicator may correspond to a digital signal indicating that the volume level of the oral presentation is too high, that the pace is too fast, or that the tone is too monotonous. Feedback information is determined from the characterizing indicator (62). Finally, the feedback information is provided characterizing the real-time oral presentation (63).

In the preceding description, numerous specific details are set forth in order to provide a thorough understanding of the present invention. It will be apparent, however, to one skilled in the art that these specific details need not be employed to practice the present invention. In addition, it is to be understood that the particular embodiments shown and described by way of illustration is in no way intended to be considered limiting. Reference to the details of these embodiments is not intended to limit the scope of the claims.

We claim:

1. A system comprising:
   signal processor for processing an audio signal corresponding to and during a real-time oral presentation to generate at least one representation of the audio signal including at least an energy function representation and a zero-crossing rate function representation;
   analyzer for analyzing at least the one representation to generate at least one characterizing indicator corresponding to the oral presentation;
   output device for providing feedback information characterizing the oral presentation in response to the at least one characterizing indicator.

2. The system as described in claim 1 wherein the feedback information is provided during the real-time oral presentation on a real-time basis.

3. The system as described in claim 1 wherein the feedback information is provided after the real-time oral presentation.

4. The system as described in claim 1 wherein the output device stores feedback information in the form of stored phrases.

5. The system as described in claim 1 further comprising a volume analyzer for detecting percentage of energy peaks in a given interval of the energy function representation having a magnitude greater or less than preselected threshold values and comparing to a preselected percentage.

6. The system as described in claim 1 further comprising a pace analyzer for detecting the number of peaks within a given interval of the energy function representation to identify number of syllables spoken in the interval and comparing the identified number of syllables spoken to a preselected range to identify when the oral presentation does not conform to a preselected pace.

7. The system as described in claim 1 further comprising a filler word analyzer for detecting flat intervals within the zero-crossing rate function representation corresponding to filler words in the oral presentation.

8. The system as described in claim 1 further comprising a filler word analyzer for detecting intervals without significant troughs within the energy function representation corresponding to filler words in the oral presentation.

9. The system as described in claim 1 further comprising a pause analyzer for detecting intervals in the range of none to very low energy within the energy function representation corresponding to pauses in the oral presentation.

10. The system as described in claim 1 further comprising a tone analyzer for detecting variances of amplitude of energy peaks within the energy function representation to determine a tone variation value of the oral presentation and comparing the tone variation to preselected tone variation threshold values.

11. The system as described in claim 1 further comprising an oral presentation time analyzer comprising:
    a speech recognizer for identifying a key word in the audio signal;
    a means for linking the key word to a slide associated with the oral presentation and predetermined time information associated with the slide.

12. A method comprising:
    processing an audio signal corresponding to and during a real-time oral presentation so as to generate at least one representation of the audio signal including at least an energy function representation and a zero-crossing rate function representation;
    analyzing at least the one representation to obtain at least one characterizing indicator corresponding to the oral presentation;
    determining feedback information from the at least one characterization indicator;
    providing the feedback information characterizing the real-time oral presentation.

13. The method as described in claim 12 comprising providing the feedback information during the oral presentation on a real-time basis.

14. The method as described in claim 12 comprising providing the feedback information after the oral presentation.

15. The method as described in claim 12 further comprising detecting the percentage of energy peaks in a given interval of the energy function representation having a magnitude greater or less than preselected threshold values and comparing to a preselected percentage.

16. The method as described in claim 12 further comprising detecting the number of peaks within a given interval of the energy function representation to identify number of syllables spoken in the interval and comparing the identified number of syllables spoken to a preselected range to identify when the oral presentation does not conform to a preselected pace.

17. The method as described in claim 12 comprising detecting flat intervals within the zero-crossing rate function representation corresponding to filler words in the oral presentation.

18. The method as described in claim 12 comprising detecting intervals without significant troughs within the energy function representation corresponding to filler words in the oral presentation.

19. The method as described in claim 12 comprising detecting intervals in the range of none to very low energy within the energy function representation corresponding to pauses in the oral presentation.

20. The method as described in claim 12 comprising detecting variances of amplitude of energy peaks within the energy function representation to determine a tone variation value of the oral presentation and comparing the tone variation to preselected tone variation threshold values.

21. The method as described in claim 12 comprising analyzing oral presentation time characteristics by identifying key words in the audio signal and linking the key words to a slide associated with the oral presentation and a predetermined time information associated with the slide.

22. A computer readable medium for causing a processor in a computer system to perform processing instructions comprising:
   processing an audio signal corresponding to and during a real-time oral presentation so as to generate at least one representation of the audio signal including at least an energy function representation and a zero-crossing rate function representation;
   analyzing at least the one representation to obtain at least one characterizing indicator corresponding to the oral presentation;
   determining feedback information from the at least one characterization indicator;
   providing the feedback information characterizing the real-time oral presentation.

23. A system comprising a processor for:
   processing an audio signal corresponding to and during a real-time oral presentation so as to generate at least one representation of the audio signal including at least an energy function representation and a zero-crossing rate function representation;
   analyzing at least the one representation to obtain at least one characterizing indicator corresponding to the oral presentation;
   determining feedback information from the at least one characterization indicator;
   providing the feedback information characterizing the real-time oral presentation.

24. The system as described in claim 23 further comprising an output device for providing the feedback information by one of an audio signal, a visual signal, and a combination of an audio and visual signal.

25. The system as described in claim 24 wherein the output device is one of an earphone, display screen, and a printer.

26. The system as described in claim 23 wherein the feedback information is one of command phrases and evaluation phrases.

\* \* \* \* \*